(12) United States Patent
Fuller et al.

(10) Patent No.: US 10,388,063 B2
(45) Date of Patent: Aug. 20, 2019

(54) VARIABLE RATE SHADING BASED ON TEMPORAL REPROJECTION

(71) Applicant: Microsoft Technology Licensing, LLC, Redmond, WA (US)

(72) Inventors: Martin J. I. Fuller, Warwick (GB); Ivan Nevraev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 15/639,389

(22) Filed: Jun. 30, 2017

(65) Prior Publication Data

US 2019/0005714 A1    Jan. 3, 2019

(51) Int. Cl.
| | |
|---|---|
| *G06T 15/80* | (2011.01) |
| *G06T 1/20* | (2006.01) |
| *G06T 15/00* | (2011.01) |
| *G06T 17/20* | (2006.01) |

(52) U.S. Cl.
CPC ............... *G06T 15/80* (2013.01); *G06T 1/20* (2013.01); *G06T 15/005* (2013.01); *G06T 17/20* (2013.01); *G06T 2200/12* (2013.01)

(58) Field of Classification Search
CPC ............................. G06T 15/506; G06T 15/50
USPC ...................................................... 345/426
See application file for complete search history.

(56) References Cited

U.S. PATENT DOCUMENTS

| | | | |
|---|---|---|---|
| 9,355,483 B2 | 5/2016 | Lum et al. | |
| 9,569,883 B2 | 2/2017 | Vaidyanathan et al. | |
| 9,569,886 B2 | 2/2017 | Akenine-Moller et al. | |
| 9,595,083 B1* | 3/2017 | Smith | G06T 19/20 |
| 2004/0001069 A1 | 1/2004 | Snyder et al. | |
| 2010/0001999 A1* | 1/2010 | Everitt | G06T 11/40 345/426 |
| 2015/0070355 A1 | 3/2015 | Clarberg et al. | |
| 2015/0170408 A1* | 6/2015 | He | G06T 15/80 345/426 |
| 2015/0262413 A1 | 9/2015 | Baker et al. | |
| 2015/0287240 A1 | 10/2015 | Janczak et al. | |
| 2015/0379688 A1* | 12/2015 | Cheng | G06T 1/20 345/428 |
| 2016/0048999 A1 | 2/2016 | Patney et al. | |
| 2017/0263046 A1* | 9/2017 | Patney | G06T 15/20 |

OTHER PUBLICATIONS

Scherzer, D., Jeschke, S., and Wimmer, M. 2007. Pixelcorrect shadow maps with temporal reprojection and shadow test confidence. In Rendering Techniques, 45-50.*

(Continued)

*Primary Examiner* — Jin Ge
(74) *Attorney, Agent, or Firm* — Arent Fox LLP

(57) ABSTRACT

Methods and devices for performing variable rate shading in graphics processing are described. A transformation pass can be performed over a current frame associate a current pixel in a current frame with a previous pixel in a previous frame. A previous fragment, including the previous pixel, in the previous frame can be analyzed to determine whether the previous fragment includes one or more areas of frequency detail achieving a threshold. A variable shading rate to apply to a current fragment including the current pixel can be determined based on analyzing the previous fragment.

20 Claims, 7 Drawing Sheets

(56) References Cited

OTHER PUBLICATIONS

Herzog R., Eisemann E., Myszkowski K., Seidel H.-P.: Spatio-temporal upsampling on the GPU. In Proc. I3D (2010), pp. 91-98. 5.*

He, Y., Gu, Y., and Fatahalian, K. 2014. Extending the graphics pipeline with adaptive, multi-rate shading. ACM Trans. Graph. 33, 4 (July), 142:1-142:12.*

Ragan-Kelley, et al., "Decoupled Sampling for Graphics Pipelines", In Journal of ACM Transactions on Graphics, vol. 30, Issue 3, May 2011, 17 pages.

\* cited by examiner

VARIABLE RATE SHADING BASED ON TEMPORAL REPROJECTION

BACKGROUND

The present examples relate to a computer device, and more particularly, to performing variable sample rate shading in rendering graphics on a computer device.

Computer graphics systems, which can render 2D objects or objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DIRECTX collection of application programming interfaces by MICROSOFT CORPORATION, including the DIRECT3D API, is an example of APIs that have graphic pipeline models. Another example includes the Open Graphics Library (OPENGL) API. The graphics pipeline typically includes a number of stages to convert a group of vertices, textures, buffers, and state information into an image frame on the screen. For instance, one of the stages of the graphics pipeline is a shader. A shader is a piece of code running on a specialized processing unit, also referred to as a shader unit or shader processor, usually executing multiple data threads at once, programmed to generate appropriate levels of color and/or special effects to pixels being rendered. In particular, for example, a vertex shader processes traits (position, texture coordinates, color, etc.) of a vertex, and a pixel shader processes traits (texture values, color, z-depth and alpha value) of a pixel.

Additionally, in rendering temporally adjacent frames (e.g., images) of a video stream, the GPU can use a temporal anti-aliasing process to transform pixels of objects from a previous frame to pixels of the objects in a current frame. Defining a transform relationship between pixels of the previous and current frames, in this regard, can allow the GPU to blend the previous frame pixels with pixels in the current frame, injecting additional information to reduce aliasing artefacts.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

One example relates to a method for performing variable rate shading in graphics processing. The method includes performing a transformation pass over a current frame to associate a current pixel in a current frame with a previous pixel in a previous frame, analyzing a previous fragment, including the previous pixel, in the previous frame to determine whether the previous fragment includes one or more areas of frequency detail achieving a threshold, determining, based on the analyzing the previous fragment, a variable shading rate, to apply to a current fragment including the current pixel, and applying the variable shading rate to the current fragment in the current frame.

In another example, a computer device includes a memory and a graphics processing unit (GPU) in communication with the memory. The GPU is configured to perform a transformation pass over a current frame to associate a current pixel in a current frame with a previous pixel in a previous frame, analyze a previous fragment, including the previous pixel, in the previous frame to determine whether the previous fragment includes one or more areas of frequency detail achieving a threshold, determine, based on analyzing the previous fragment, a variable shading rate, to apply to a current fragment including the current pixel, and apply the variable shading rate to the current fragment in the current frame.

In a further example, a computer-readable medium storing computer-executable instructions executable by a processor for performing variable rate shading in graphics processing. The instructions include instructions for performing a transformation pass over a current frame to associate a current pixel in a current frame with a previous pixel in a previous frame, instructions for analyzing a previous fragment, including the previous pixel, in the previous frame to determine whether the previous fragment includes one or more areas of frequency detail achieving a threshold, instructions for determining, based on the instructions for analyzing the previous fragment, a variable shading rate, to apply to a current fragment including the current pixel, and instructions for applying the variable shading rate to the current fragment in the current frame.

Additional advantages and novel features relating to examples of the present invention will be set forth in part in the description that follows, and in part will become more apparent to those skilled in the art upon examination of the following or upon learning by practice thereof.

DETAILED DESCRIPTION

The described solutions provide a graphical processing unit (GPU) with a flexible, dynamic mechanism that provides variable rate shading of pixels or other fragments (e.g., collections of pixels) where the shading rate of an image is determined based at least in part on temporal reprojection of information from a previous image. The images can correspond to frames of a video (e.g., consecutive or otherwise temporally distinct frames). For example, previous pixels of a previous image can be associated with a current pixels of a current image (e.g., based on running a transformation pass over the current image based on camera and/or object motion). The variable shading rate (and/or other shading parameters) for shading the current fragment of the current image can be determined based on one or more characteristics determined for a previous fragment, including one or more of the previous pixels, of the previous frame. For example, the one or more characteristics can be determined based on at least one of examining pixel values of the previous fragment (e.g., within the fragment or within the larger frame or other screen-space size) to detect the characteristics, metadata generated during the previous variable rate shading pass for the previous frame, etc.

In one example, the previous fragment can be analyzed (e.g., individually and/or as part of a larger area of the previous image) to determine whether the previous fragment is subject to high frequency detail (e.g., that achieves at least a threshold frequency). If so, the variable shading rate selected for the current fragment can be increased or decreased and/or can otherwise be set to a certain value (e.g., a maximum value) based on determining that the previous fragment is subject to the high frequency detail.

In any case, using variable rate shading parameters computed based on characteristics of the previous image based on associating the pixels (e.g., where associating the pixels can be shared with other stages, such as in performing temporal anti-aliasing) can allow for applying a more desired shading of certain objects in the image. For example, coarser shading can be applied in some areas of the image (e.g., in areas determined to have low frequency detail based on the previous frame) while finer shading can be applied in other areas of the image (e.g., in areas determined to have high frequency detail based on the previous frame).

Figure 1:
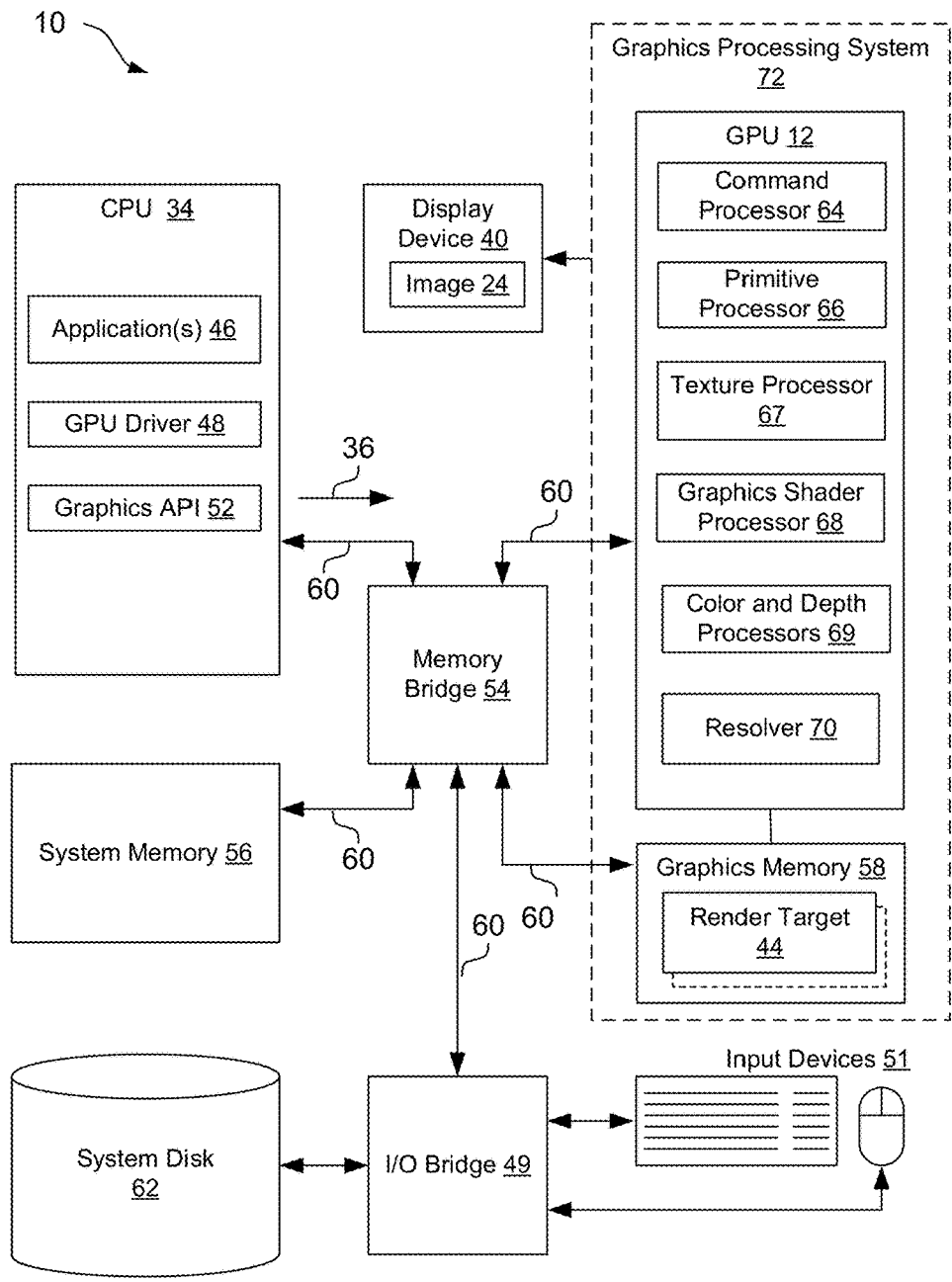
FIG. 1 is a schematic block diagram of an example architecture of a computer device including a graphics processing unit and a graphics pipeline configured according to the described examples.

Referring to FIG. 1, in one example, a computer device 10 includes a graphics processing unit (GPU) 12 configured to implement the described features of performing variable rate shading of an image based on temporally reprojecting characteristics of objects of a previous image. For example, GPU 12 is configured to determine and use information from variable rate shading in one image to provide variable rate shading in a subsequent image (e.g., where the images correspond to frames of a video). In an example, GPU 12 can perform a transformation pass over the current image based on the previous image to correlate objects of the current image that are the same as, or at least have a threshold similarity to, objects of the previous image. This correlation can facilitate determining and using characteristics of the objects of the previous image for determining a variable shading rate to apply to the objects (and/or associated fragments) of the current image. In one example, GPU 12 can analyze the previous image to determine areas of high or low frequency detail, and can modify the variable shading rate parameters for these areas (e.g., and/or associated fragments) of the current image.

For example, in one implementation, computer device 10 includes a CPU 34, which may be one or more processors that are specially-configured or programmed to control operation of computer device 10 according to the described examples. For instance, a user may provide an input to computer device 10 to cause CPU 34 to execute one or more software applications 46. Software applications 46 that execute on CPU 34 may include, for example, but are not limited to one or more of an operating system, a word processor application, an email application, a spread sheet application, a media player application, a video game application, a graphical user interface application or another program. Additionally, CPU 34 may include a GPU driver 48 that can be executed for controlling the operation of GPU 12. The user may provide input to computer device 10 via one or more input devices 51 such as a keyboard, a mouse, a microphone, a touch pad or another input device that is coupled to computer device 10 via an input/output bridge 49, such as but not limited to a southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may comprise one or more primitives, as explained in more detail below. For instance, in some implementations, the software application 46 places graphics commands 36 in a buffer in the system memory 56 and the command processor 64 of the GPU 12 fetches them. In some examples, the software instructions may conform to a graphics application programming interface (API) 52, such as, but not limited to, a DirectX and/or Direct3D API, an Open Graphics Library (OpenGL®) API, an Open Graphics Library Embedded Systems (OpenGL ES) API, an X3D API, a RenderMan API, a WebGL API, Metal API, Vulkan API or any other public or proprietary standard graphics API. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points, lines, triangles, quadrilaterals, triangle strips, etc.

Computer device 10 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. In an example, for example, memory bridge 54 may be a northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store user applications 46 and other information for use by and/or generated by other components of computer device 10. For example, system memory 56 may act as a device memory for GPU 12 (although, as illustrated, GPU 12 may generally have a direct connection to its own graphics memory 58) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, in an example, computer device 10 may include or may be communicatively connected with a system disk 62, such as a CD-ROM or other removable memory device. System disk 62 may include programs and/or instructions that computer device 10 can use, for example, to boot operating system in the event that booting operating system from system memory 56 fails. System disk 62 may be communicatively coupled to the other components of computer device 10 via input/output bridge 49.

As discussed above, GPU 12 may be configured to perform graphics operations to render one or more render targets 44 (e.g., based on graphics primitives) to display device 40 to form image 24. For instance, when one of the software applications 46 executing on CPU 34 requires graphics processing, CPU 34 may provide graphics commands and graphics data associated with image 24, along with graphics command 36, to GPU 12 for rendering to display device 40. The graphics data may include, e.g., drawing commands, state information, primitive information, texture information, etc. GPU 12 may include one or more processors, including a command processor 64 for receiving graphics command 36 and initiating or controlling the subsequent graphics processing by at least one primitive processor 66 for assembling primitives, a plurality of graphics shader processors 68 for processing vertex, surface, pixel, and other data for GPU 12, one or more texture processors 67 for generating texture data for fragments or pixels, and one or more color and depth processors 69 for generating color data and depth data and merging the shading output. For example, primitive processor 66 may implement input assembler and rasterizer stages of a logical graphics pipeline, as is discussed below. GPU 12 may, in some instances, be built with a highly parallel structure that provide more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34.

GPU 12 may, in some instances, be integrated into a motherboard of computer device 10. In other instances, GPU 12 may be present on a graphics card that is installed in a port in the motherboard of computer device 10 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an example, GPU 12 may be directly coupled to graphics memory 58. For example, graphics memory 58 may store any combination of index buffers, vertex buffers, texture buffers, depth buffers, stencil buffers, render target buffers, frame buffers, state information, shader resources, constants buffers, coarse shading rate parameter (SRP) maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multisample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some examples, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 10 via a wired or wireless communications link. For instance, display device 40 may be a computer monitor or flat panel display connected to a personal computer via a cable or wireless link.

According to one example of the described features, graphics API 52 and GPU driver 48 may configure GPU 12 to execute logical graphics pipeline 14 to perform variable rate shading as described herein.

Figure 2:
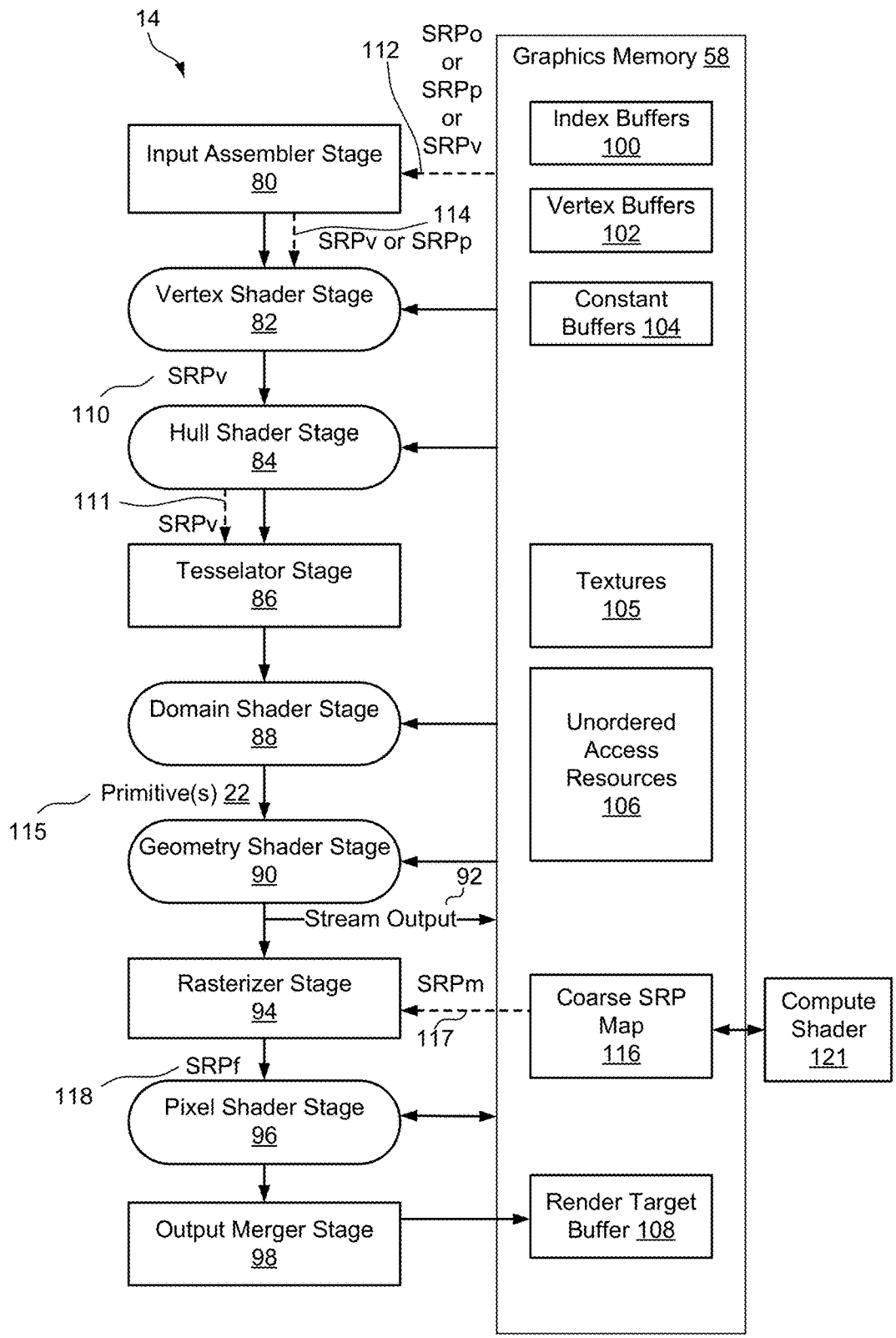
FIG. 2 is a schematic diagram of an example of the graphics pipeline and graphics memory of the computer device of FIG. 1.

Referring to FIG. 2, for instance, in one example, GPU 12 can be configured to implement the stages of an example logical graphics pipeline 14 that may to perform variable rate shading as described herein. In an example, one or more of the various stages may be programmable, for instance, to provide the variable rate deferred passes over a determined subset of modified pixels described herein. Moreover, in an example, common shader cores may be represented by the rounded rectangular blocks. The purpose of each of the example stages in the example logical graphics pipeline 14 is now described in brief below, and additional functionality is further described with respect to subsequent figures. The logical graphics pipeline 14 may include all or a portion of these stages (and/or additional stages) for generating an image.

The input assembler stage 80 supplies data (triangles, lines, points, and indexes) to the pipeline. It also optionally processes shading rate parameters per object (SRPo), per primitive (SRPp), or per vertex (SRPv), generally referenced at 112, as determined by the application 46 (FIG. 1). As generally indicated at 114, input assembler stage 80 may output the SRPp, or an SRPv if the SRPv is not generated by a vertex shader stage 82.

The vertex shader stage 82 processes vertices, typically performing operations such as transformations, skinning, and lighting. Vertex shader stage 82 takes a single input vertex and produces a single output vertex. Also, as indicated at 110, vertex shader stage 82 optionally inputs the per-vertex shading rate parameter (SRPv) or the per-primitive shading rate parameter (SRPp) and typically outputs an SRPv, that is either input or calculated or looked up. It should be noted that, in some implementations, such as when using higher-order surfaces, the SRPv comes from a hull shader stage 84.

The hull shader stage 84, a tessellator stage 86, and a domain-shader 88 stage comprise the tessellation stages— The tessellation stages convert higher-order surfaces to triangles, e.g., primitives, as indicated at 115, for rendering within logical graphics pipeline 14. Optionally, as indicated at 111, hull shader stage 84 can generate the SRPv value for each vertex of each generated primitive (e.g., triangle).

The geometry shader stage 90 optionally (e.g., this stage can be bypassed) processes entire primitives 22. Its input may be a full primitive 22 (which is three vertices for a triangle, two vertices for a line, or a single vertex for a point), a quad, or a rectangle. In addition, each primitive can also include the vertex data for any edge-adjacent primitives. This could include at most an additional three vertices for a triangle or an additional two vertices for a line. The geometry shader stage 90 also supports limited geometry amplification and de-amplification. Given an input primitive 22, the geometry shader stage 90 can discard the primitive, or emit one or more new primitives. Each primitive emitted can output an SRPv for each vertex.

The stream-output stage 92 streams primitive data from graphics pipeline 14 to graphics memory 58 on its way to the rasterizer. Data can be streamed out and/or passed into a rasterizer stage 94. Data streamed out to graphics memory 58 can be recirculated back into graphics pipeline 14 as input data or read-back from the CPU 34 (FIG. 1). This stage may optionally stream out SRPv values to be used on a subsequent rendering pass.

The rasterizer stage 94 clips primitives, prepares primitives for a pixel shader stage 96, and determines how to invoke pixel shaders. Further, as generally indicated at 118, the rasterizer stage 94 can perform coarse scan conversions and determine a per-fragment variable shading rate parameter value (SRPf) (e.g., where the fragment may be a tile, a sub-tile, a quad, a pixel, or a sub-pixel region). Additionally, the rasterizer stage 94 performs fine scan conversions and determines pixel sample positions covered by the fragments.

Further, as indicated at 117, the rasterizer stage 94 can also obtain lookup values (SRPm) from coarse SRP map 116. The lookup values correspond to shading rates specified for a larger area, such as a screen space of the image 24 or the entire image 24. Additionally, the rasterizer stage 94 computes SRPf as a function SRPv and the lookup values (SRPm), as described in further detail below. In one example, as described further herein, a compute shader 121 can generate the SRP values based on one or more characteristics detected for one or more fragments in a previous frame, and can accordingly generate the coarse map 116 that the rasterizer stage 94 uses to determine shading rates.

The pixel shader stage 96 receives interpolated data for primitives and/or fragments and generates per-pixel data, such as color and sample coverage masks.

The output merger stage 98 combines various types of pipeline output data (pixel shader values, depth and stencil information, and coverage masks) with the contents of the render target 44 (FIG. 1) and depth/stencil buffers to generate the final result of graphics pipeline 14.

Also, as discussed above and as illustrated in FIG. 2, graphics pipeline 14 may operate in conjunction with graphics memory 58 for exchanging and storing data. For example, graphics memory 58 includes one or more vertex buffers 100 that each contains the vertex data used to define geometry of image 24 (or other images). Vertex data includes position coordinates, color data, texture coordinate data, normal data, and so on. The simplest example of vertex buffer 100 is one that only contains position data. More often, vertex buffer 100 contains all the data needed to fully specify 3D vertices. An example of this could be vertex buffer 100 that contains per-vertex position, normal and texture coordinates. This data is usually organized as sets of per-vertex elements.

Further, in an example, graphics memory 58 may include one or more index buffers 102, which contain integer offsets into vertex buffers 100 and are used to render primitives 22 more efficiently. Each index buffer 102 contains a sequential set of indices; each index is used to identify a vertex in a vertex buffer.

Also, in an example, graphics memory 58 may include one or more constant buffers 104 that allows an efficient supply of shader constants, shader data, and/or any other shader resources to graphics pipeline 14. Further, constant buffer 104 can be used to store the results of the stream-output stage 92. Moreover, graphics memory 58 may include one or more texture buffers or textures data 105, such as bitmaps of pixel colors that give an object the appearance of texture.

Additionally, in an example, graphics memory 58 may include one or more unordered access resources 106 (which includes buffers, textures, and texture arrays—without multisampling). Unordered access resources 106 allow temporally unordered read/write access from multiple threads. This means that this resource type can be read/written simultaneously by multiple threads without generating memory conflicts through the use of certain defined functions.

Moreover, in an example, graphics memory 58 may include one or more render target buffers 108, which contain the rendered target or drawing of each pixel 32 of image 24 produced by graphics pipeline 14.

As described in more detail below with respect to the method of operation of graphics pipeline 14 according to the described apparatus and methods, input assembler stage 80 and/or vertex shader stage 82 are configured to determine an SRP value per vertex (SRPv) 110 for each vertex of each primitive 22 of image 24. For example, SRPv value 110 may be determined for each vertex based on one or more SRP values per object (SRPo), SRP values per primitive (SRPp), or SRPp values supplied by application 46 (FIG. 1), e.g., at 112, and/or determined by input assembler stage 80, e.g., at 114, or based on a coarse SRP map 116. Further, rasterizer stage 94 may interpolate and quantize respective SRPv values 110 for different sub-tiles or fragments of each primitive 22 to define SRP values per fragment (SRPf) 118.

Figure 3:
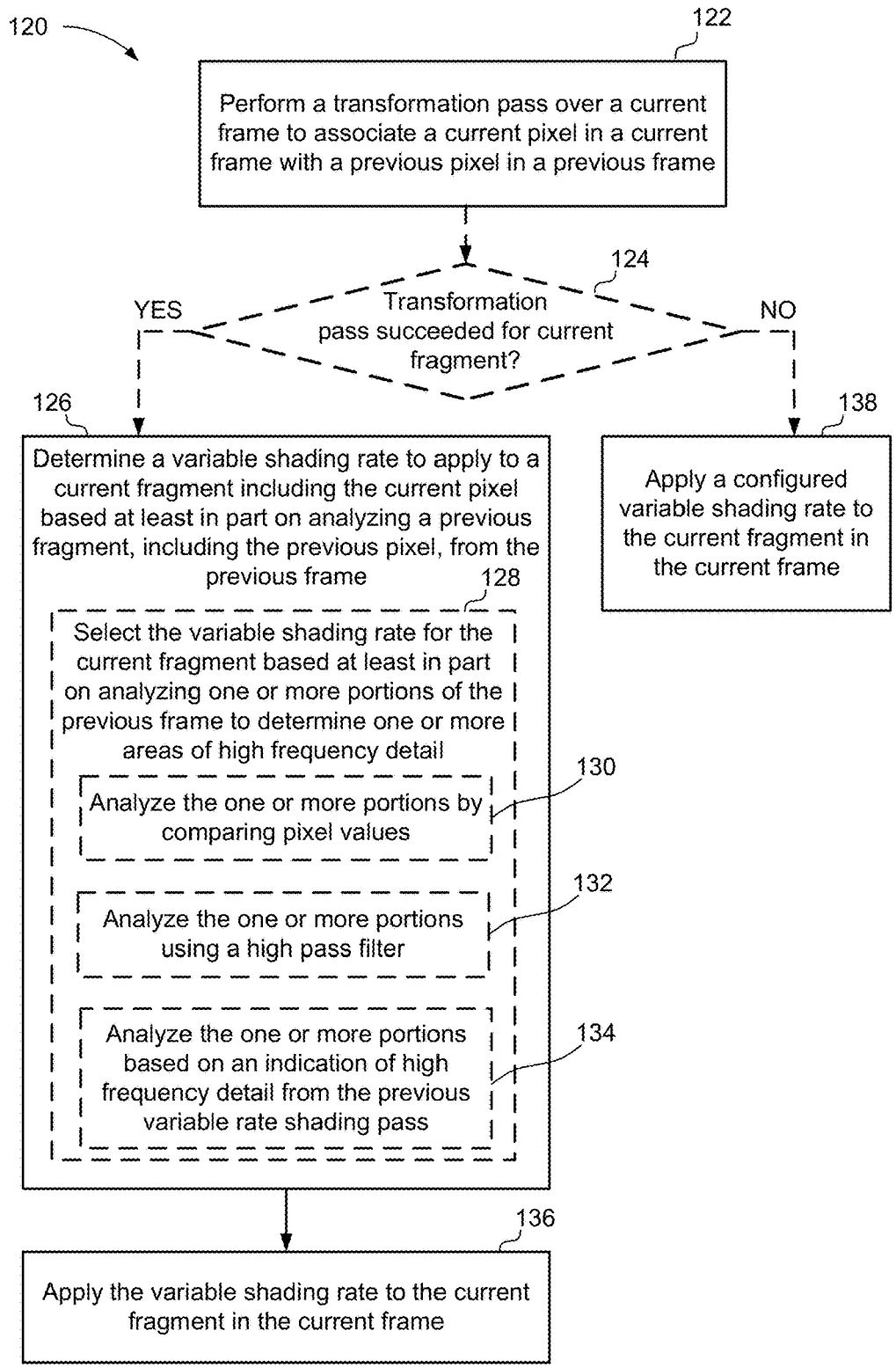
FIG. 3 is a flowchart of an example of a method of performing variable rate shading according to the described examples.
Figure 4:
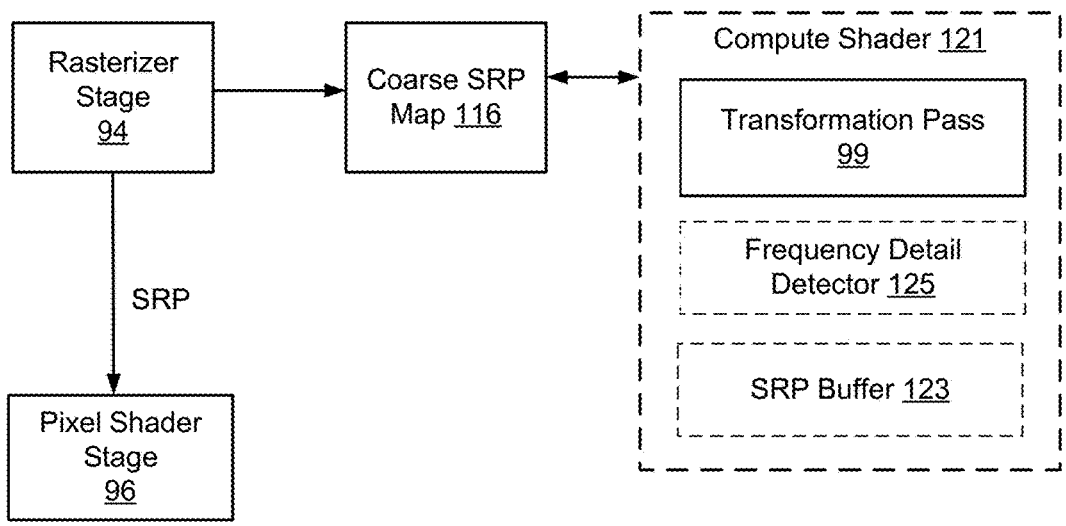
FIG. 4 is a schematic diagram of an example of a primitive of an image, and fragments covered by the primitive, and an example of a rasterizer stage and subcomponents associated with the operation in the method of FIG. 3.
Figure 4:
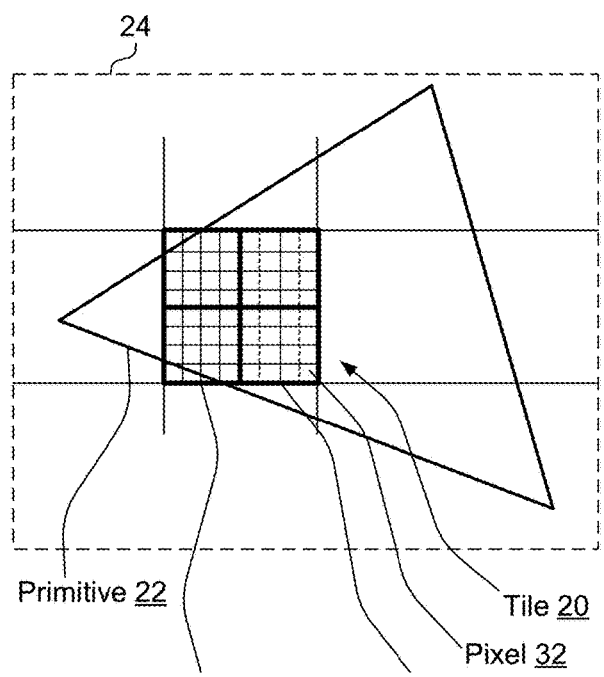

Referring to FIGS. 3 and 4, one example of operating graphics pipeline 14 to perform variable rate shading based on temporal reprojection as described herein may be explained with reference to a method 120 of rendering graphics in FIG. 3, and with reference to image 24 and corresponding components of rasterizer stage 94 of FIG. 4. In particular, image 24 includes one or more primitives 22 covering one or more tiles 20, which may include one or more fragments 18 (e.g., sub-tile1 and sub-tile2) per tile 20 and/or one or more pixels 32.

At 122, method 120 includes performing a transformation pass over a current frame to associate a current pixel in a current frame with a previous pixel in a previous frame. In an example, compute shader 121 may be configured to perform the transformation pass 99 over the current frame (e.g., image 24) to associate a current pixel in a current frame (e.g., pixel 32) with a previous pixel in a previous frame. For example, the frames may be images of a video having a temporal relationship (e.g., consecutive frames in a video stream). In an example, the GPU 12, associated graphics pipeline 14, and/or compute shader 121 (e.g., by performing the transformation pass 99) can determine areas of high or low frequency detail in fragments of the previous frame, used to determine the shading rate for corresponding fragments in the current frame. In an example, this transformation pass, 99, shading rate determination and/or corresponding data can be for computing the current frame shading rate (e.g., generating a coarse SRP map 116) and/or for other processes, such as temporal anti-aliasing to blend the pixels of the previous frame with pixels in the current frame.

In an example, the transformation pass 99 can account for a camera transform between the frames (e.g., where the camera or view point moves from frame-to-frame), where some similarities may exist, but may be offset in location in the images corresponding to the frames. In an example, the transformation pass 99 can transform each pixel from the previous frame via the difference between the camera transform of the previous frame and the camera transform of the current frame. In one example, the compute shader 121 can be dispatched by an application (e.g., application 46 executing on a CPU 34 in FIG. 1). The application can leverage the GPU 12 and/or graphics pipeline 14 to render a velocity buffer for moving objects to create a mapping between pixels in the current frame and pixels in the previous frame. For example, for each pixel in the current frame, the application can use the GPU 12 or graphics pipeline 14 to output, per pixel, the x-coordinate and y-coordinate delta from the current pixel in the current frame to the x/y coordinate of where that same pixel was on the previous frame. The application can also leverage the GPU 12 and/or graphics pipeline 14 to check whether the pixel was in the previous frame, and compare the depth at the previous frame against the depth buffer of the previous frame to detect a pixel of a disoccluded object. The application can also dispatch one or more compute shaders (e.g., compute shader 121) to compute the coarse SRP map 116, as described herein, which can utilize inputs of the previously computed velocity, disocclusion data, and pixel values for the previous frame (e.g., RGB values, output of an edge detection filter, etc.). This compute shader 121 can then output the coarse SRP map 116, as described further herein. The compute shader 121 may also use the velocity map to identify areas of disocclusion on pixels which are uncovered in the current frame due to object movement.

At 124, method 120 optionally includes determining whether the transformation pass succeeded for the current fragment. In an example, compute shader 121 may be configured to determine whether the transformation pass succeeded for the current fragment. For example, compute shader 121 can determine whether there is valid transform data for the current fragment as a result of the transformation pass 99.

Where the transformation pass 99 succeeds at 124, method 120 includes, at 126, determining a variable shading rate to apply to a current fragment including the current pixel based at least in part on a previous fragment, including the previous pixel, from the previous frame. In an example, compute shader 121 may be configured to determine the variable shading rate to apply to the current fragment including the current pixel based at least in part on the previous fragment, including the previous pixel, from the previous frame. For example, compute shader 121 may detect, based on the pixel values of the previous fragment, one or more characteristics related to objects in the previous frame. Based on the one or more characteristics, the compute shader 121 can adjust SRP values corresponding to current fragments of the current frame. In one example, compute shader 121 can adjust or generate the SRP values for the current frame as specified in a coarse SRP map 116 that is used by the rasterizer stage 94 in computing additional SRP values for use by the pixel shader stage 96 in shading one or more pixels of the image 24.

At 128, method 120 can optionally include selecting the variable shading rate for the current fragment based at least in part on analyzing one or more portions of the previous frame to determine one or more areas of high frequency detail. In an example, compute shader 121, frequency detail detector 125, etc. may be configured to select the variable shading rate for the current fragment based at least in part on analyzing the one or more portions of the previous frame to determine the one or more (or zero) areas of high frequency detail. For example, this may include selecting or generating a configured variable shading rate (e.g., for a coarse SRP map 116) and/or adjusting an already determined variable shading rate (e.g., in the coarse SRP map 116) for the current fragment. For example, where the current fragment may have a shading rate (e.g., defined in a coarse SRP map 116), compute shader 121 may select the variable shading rate by increasing or decreasing the variable shading rate stored in the SRP coarse map 116 based on the detection by frequency detail detector 125 (or may select a variable shading rate regardless of what is stored for the current fragment, both of which are described in examples below). For example, the areas of high frequency detail may benefit from having a higher variable shading rate (e.g., an increased or maximum shading rate, such as 1:1), as these areas may have not have consistency in pixel color as areas of lower frequency detail, and/or areas of low frequency detail may be accorded a lower variable shading rate, which can save processing resources. An example is shown in FIG. 5.

Figure 5:
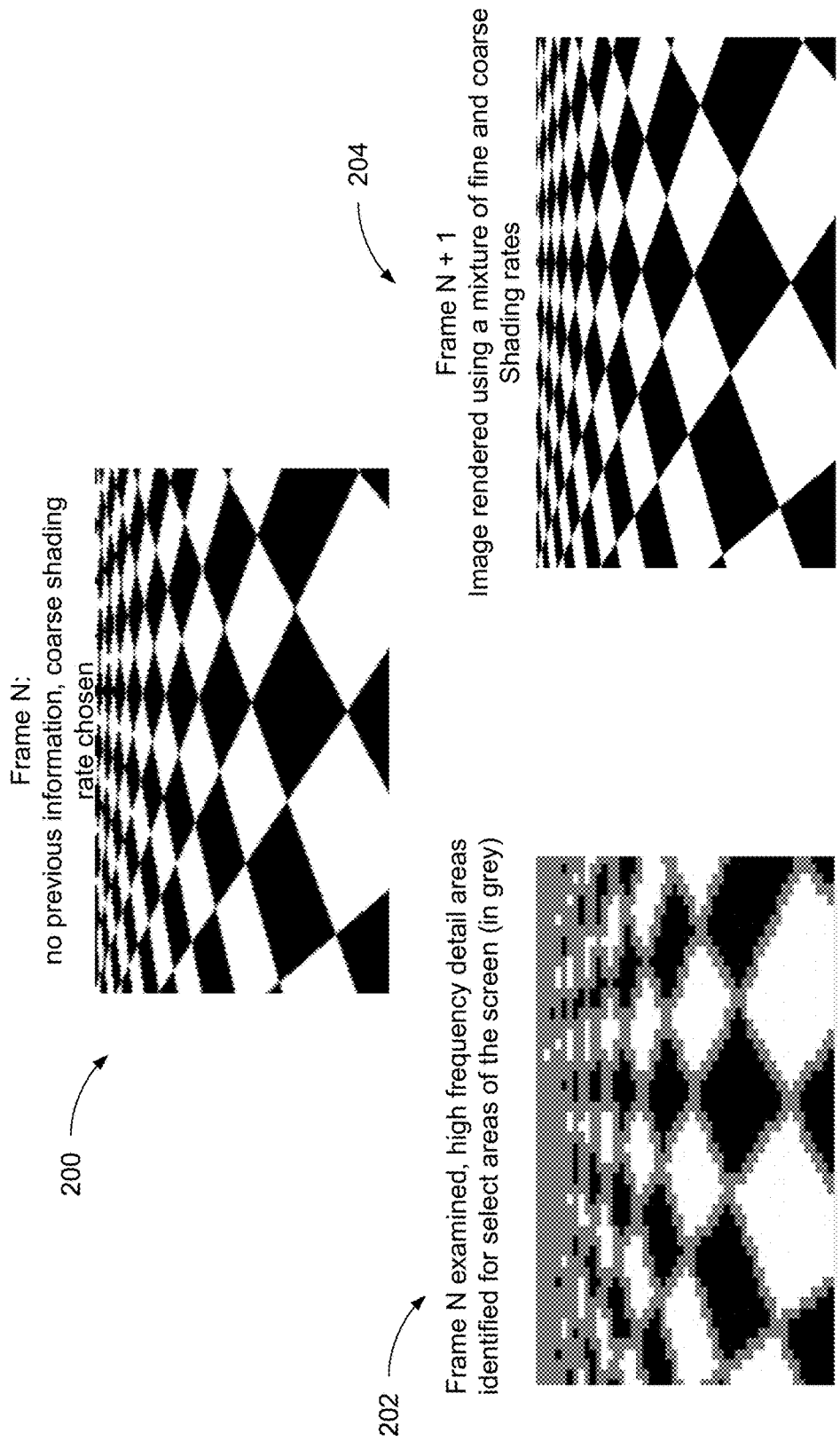
FIG. 5 is an example of frames rendered with variable rate shading according to the described examples.

FIG. 5 illustrates a previous frame N 200, for which a coarse variable shading rate is used for rendering based on no information from a frame before the previous frame to use in shading the previous frame. The previous frame N 200 can be analyzed to determine the one or more areas of high frequency detail, which are shown as shaded in gray in a high detail analyzed previous frame 202. This information can be used in applying an increased variable shading rate to fragments in the current frame N+1 204 determined to correspond to previous fragments that are within, and/or at least partially contain, the one or more areas of high frequency detail in the previous image.

In an example, analyzing the one or more areas may optionally include, at 130, analyzing the one or more portions by comparing pixel values. In an example, compute shader 121 and/or frequency detail detector 125 may be configured to analyze the one or more portions by comparing pixel values. For example, the frequency detail detector 125 can compare pixel values of neighboring pixels in the previous frame (e.g., within the previous fragment or as compared to additional pixels in the previous frame) to determine whether a difference between the absolute values of the pixels achieves one or more thresholds, which may relate to one or more levels of frequency detail. Thus, for example, one or more levels of frequency detail can be determined based on the difference between the absolute pixel values, and a variable shading rate can accordingly be determined for the current fragment corresponding to the previous fragment based on the level of frequency detail (e.g., based on the pixel values and related differences in the previous fragment).

In another example, analyzing the one or more areas may optionally include, at 132, analyzing the one or more portions using a high pass filter. In an example, compute shader 121 and/or frequency detail detector 125 may be configured to analyze the one or more portions using a high pass filter. For example, the high pass filter may include a Sobel filter or Sobel operator, or other edge detection algorithms that can be applied over the previous image to determine edges or other high frequency detail areas. In one example, compute shader 121 and/or frequency detail detector 125 can apply the high pass filter over the entire previous image and/or over a portion corresponding to the previous fragment (which is determined to correspond to the current fragment based on the object detection, as described). In this example, compute shader 121 can determine an increased, decreased or configured (e.g., maximum or some other value) shading rate for fragments depending on the output of the high pass filter. In some examples, multiple high pass filters, having various associated thresholds and corresponding variable shading rates, can be used to apply to fragments to provide various levels of granularity.

In another example, analyzing the one or more areas may additionally or alternatively optionally include, at 134, analyzing the one or more portions based on an indication of high frequency detail from the previous variable rate shading pass. In an example, graphics pipeline 14, pixel shader stage 96, etc., may be configured to output an indication of high or low frequency detail. For example, graphics pipeline 14, pixel shader stage 96, etc., in generating the previous frame, may read an indication of the frequency present from one or more texture maps from textures data 105 to determine the shading rate, or may otherwise derive the shading rate. Compute shader 121 may be configured to read the shading rate indication from render target 108 and/or derive the shading rate from other factors, including comparing pixels or a high pass filter and may generate SRP buffer 123 indicating the pixels associated with frequency detail that achieves the one or more thresholds. For example, graphics pipeline 14, compute shader 121, etc., can compare pixel values in the fragment to neighboring pixel values (e.g., compare a value of a pixel to a lower pixel, a pixel to the right, etc., in a 3×3 pixel quad) to determine whether a difference between pixel values achieves a threshold. If so, for example, the graphics pipeline 14, compute shader 121, etc., can indicate the fragment as having high frequency detail (e.g., in SRP buffer 123). This indication can be used in accordingly determining to increase a variable shading rate, or related parameters, for a current fragment that is determined to match the fragment of the previous frame indicated as having high frequency detail. For example, graphics pipeline 14, compute shader 121, etc., can determine to increase the variable shading rate to a maximum shading rate (e.g., 1:1) for fragments indicated as having high frequency detail.

In yet another example, selecting the variable shading rate may be based on other values of the previous frame, which may be output into SRP buffer 123 or render target 108 when generating the previous frame or otherwise determined by analyzing pixels of the previous frame. For example, an amount of transparent geometry in the previous fragment may be used to determine a variable shading rate for the current fragment (e.g., more transparent geometry overlaid over solid may result in choosing a lower shading rate in the current frame). In this example, when rendering transparent volumes (e.g., smoke), an opacity value can be written to a render target (e.g., an opacity value on a scale of 0 to 1, where for example 0 indicates complete transparency and 1 indicates complete opacity). In this example, compute shader 121 can utilize this information from the previous frame to drive the variable shading rate selection for fragments corresponding to the opaque primitives rendered in a current frame, such that where the primitives are occluded by transparent primitives with an opacity about certain thresholds, the variable shading rate can be accordingly reduced for fragments related to the opaque primitives in the current frame.

Furthermore, for example, a velocity of an object can be determined (e.g., based on the difference in the transformation from the previous frame to the current frame), and may be used to select the variable shading rate (e.g., if the current fragment corresponds to objects moving at a threshold velocity, it may receive a lower shading rate, such as a decreased shading rate or a configured minimum or other value shading rate). Moreover, in one example, compute shader 121 may utilize a shading rate from a coarse SRP map 116 of the previous frame in selecting the variable shading rate, and compute shader 121 may determine to increase or decrease this value for the current frame (e.g., for the current fragment corresponding to the previous fragment), which may also be based on the detected frequency detail. Furthermore in another example, the shading rate for each fragment may be determined for each frame outside of the GPU 12 and/or graphics pipeline 14 processing of the current frame (e.g., by an application using similar mechanisms of determining areas of frequency detail as described above). For example, this may include determining and outputting, by the application, a sequence of camera and object motion. In this example, the SRP buffer 123 content for each frame can be determined ahead of GPU 12 and/or graphics pipeline 14 processing of the current frame by using a high pass filter or other frequency detection operator, and stored for re-use when the sequence is replayed.

At 136, method 120 can include applying the variable shading rate to the current fragment in the current frame. In an example, graphics pipeline 14, rasterizer stage 94, etc., may be configured to apply the variable shading rate applied to the current fragment in the current frame. For example, graphics pipeline 14, rasterizer stage 94, etc., can apply the variable shading rate, or related parameters, as indicated in the coarse SRP map 116, and/or as potentially modified by compute shader 121.

Where the transformation pass 99 does not succeed at 124, method 120 includes, at 138, applying a configured variable shading rate to the current fragment in the current frame. In an example, compute shader 121 can apply the configured variable shading rate to the current fragment in the current frame. For example, compute shader 121 can apply the configured variable shading rate as an average variable shading rate (e.g., over the entire image and/or within a region), a maximum variable shading rate to the current fragment, etc. In another example, compute shader 121 can apply the configured variable shading rate as a variable shading rate determined to apply to neighboring fragments (e.g., fragments for which the transformation pass 99 does succeed), which may include applying a variable shading rate determined for a neighboring fragment in a certain direction, such as below, to the right, etc., an average of one or more (or all) neighboring fragments surrounding the fragment, and/or the like). In this example, where the transformation pass 99 does not succeed, this may indicate that the current fragment is not in the previous frame, and thus shading the fragment at a higher rate may provide more desirable rendering of the fragment. Where, however, transformation pass 99 does succeed, as described above, a lower variable shading rate can be employed, as the fragment is rendered in the previous frame (e.g., except where the fragment is determined to be in an area of high frequency detail). In an example, determining whether the transformation pass 99 succeeds at 124 can allow for detecting objects subject to disocclusion in the current frame, as well, and fragments associated with such objects can accordingly be shaded at an increased variable shading rate.

Figure 6:
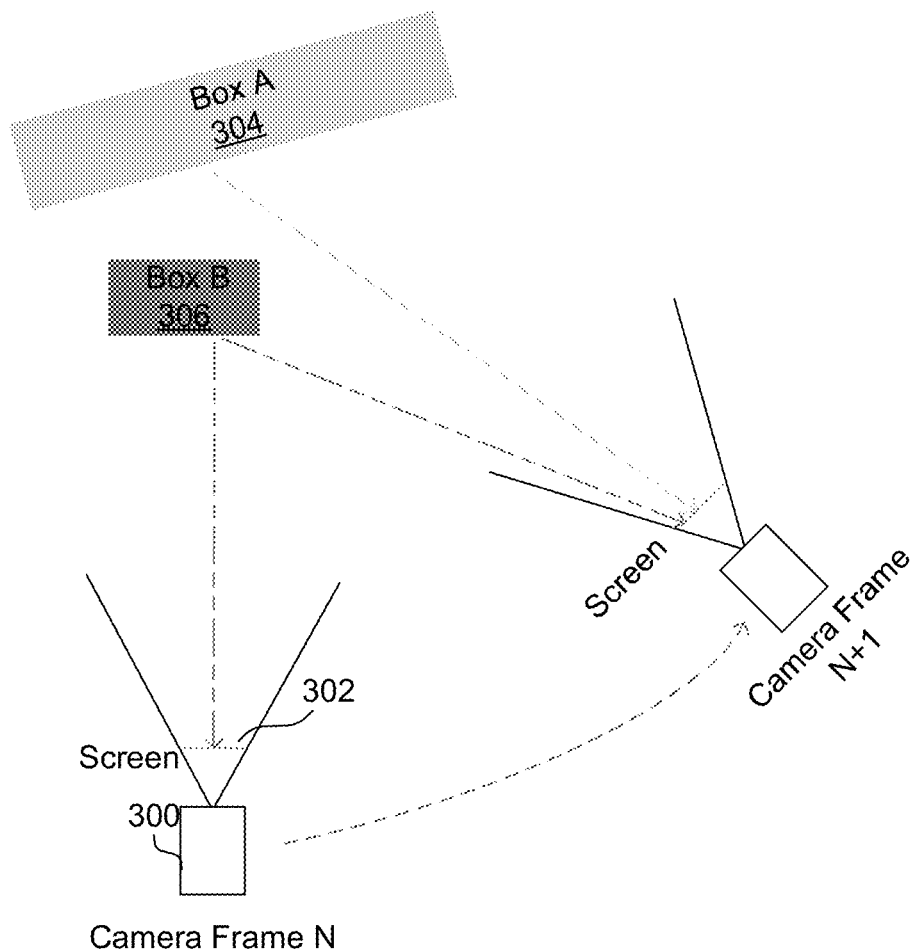
FIG. 6 is a schematic diagram of an example of a camera moving locations in capturing frames where the movement results in object disocclusion according to the described examples.

An example of disocclusion is shown in FIG. 6, which illustrates a camera 300 having a screen 302. The camera 300, which may be an actual camera or a virtual camera, captures a scene outside of screen 302. The scene can include Box A 304 and Box B 306, which can correspond to objects in the scene. The camera 300 can capture a frame N (e.g., image) of the scene, which may show Box B 306, but Box A 304 may be at least partially occluded. In frame N+1, the camera 300 moves to another location and captures the frame N+1 of the scene, which may include Box B 306 and Box A 304. Thus, Box A 304 is at least partially disoccluded in frame N+1, and Box A 304 (or portions thereof) may accordingly be shaded at a higher variable shading rate in frame N+1 than Box B 306 (or portions thereof).

In any case, the variable shading rate, or related parameters (e.g., SRP values) can be output to the coarse SRP may 116 (e.g., by compute shader 121), and used by the rasterizer stage 94 and/or the pixel shader stage 96 to perform variable rate shading. In this example, a render target can be generated based on the fragment and additional fragments having the variable shading rate applied. An example is shown in FIG. 5, where current frame 204 can be rendered using different variable shading rates where some variable shading rates are reprojected from the previous frame 200, and some variable shading rates are increased or decreased based on being determined to be located in areas of high or low frequency detail, as in frame 202.

Figure 7:
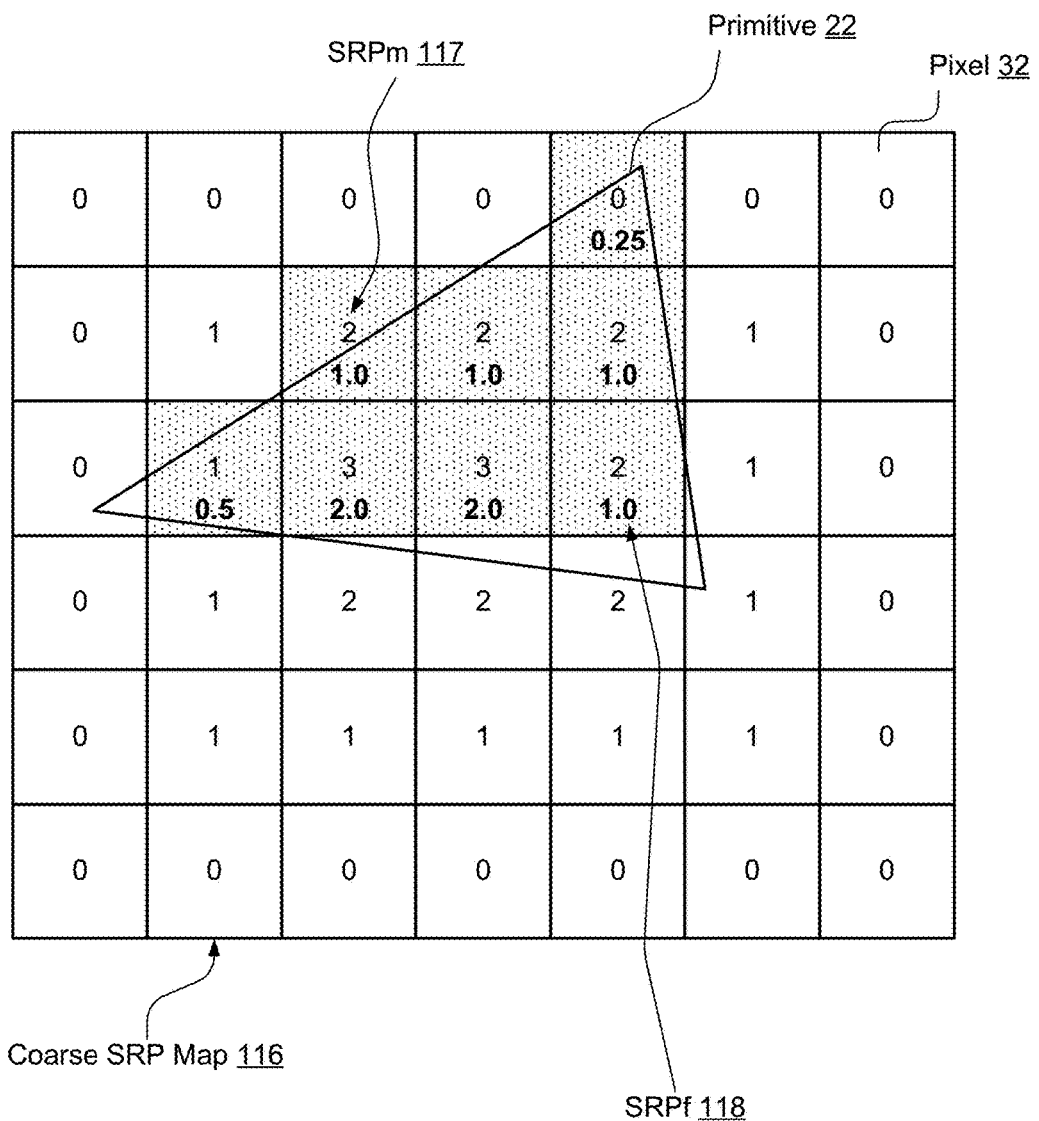
FIG. 7 is an example of calculating fragment variable SRP values for fragments of a coarse SRP map during a rasterization stage in a graphics pipeline according to the described examples.

FIG. 7 illustrates an example of performing variable rate shading. In one example, performing variable rate shading, as described herein, may include looking up a coarse SRP map 116 to obtain SRPm 117 for a given pixel. For example, graphics pipeline 14 executes rasterizer stage 94 to look up the SRP map to obtain SRPm, such that, one or more look up values in a SRP map 116 (SRPm 117) may be identified for one or more pixels 32 within one or more primitives 22 of one or more objects based at least on coarse texture map coordinates. In an example, the looked up SRPm can be added to a base shading rate for the pixel stored in a register to produce the final SRP value for the relevant fragments within the designated screen region.

In an example, the map coordinates include coarse screen position coordinates (X, Y) of each pixel. In an example, fine scan conversion can be performed to determine sample positions covered within the current fragment (or pixel). Further, in this example, in order to calculate the respective SRPf 118, graphics pipeline 14 can execute rasterizer stage 94 to perform a fine scan conversion to determine the respective SRPf 118 using each of the one or more pixels 32 of the one or more primitives using interpolators and SRPm 117. For example, rasterizer stage 94 may include a fine rasterizer stage configured to perform this functionality. In particular, in an example, for each pixel 32, graphics pipeline 14 can execute rasterizer stage 94 to calculate respective pixel variable SRP values (SRPf 118) based on a base shading rate and a lookup value (e.g., SRPm 117) corresponding to the pixel 32. In an example, fragment variable SRP values for fragments of a coarse SRP map may be calculated based on the function:

$$SRPf = BSR \times 2^{SRPm[x,y]}$$

where BSR corresponds to the base shading rate for the specific pixel 32, and SRPm[x,y] corresponds to the lookup value for the specific pixel 32. In some examples, the base shading rate may correspond to a previous SRPf that is multiple by $2^{SRPm[x,y]}$.

In another example, rasterizer stage 94 can utilize temporally reprojected values of SRPm from the coarse SRP map 116 (e.g., as potentially modified by the compute shader 121) in determining SRPf for one or more fragments determined to be the same as or similar to fragments in a previous frame, as described above.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various examples are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various examples or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some examples, the processor and the storage medium may reside in an ASIC. Additionally, the ASIC may reside in a computer device (such as, but not limited to, a game console). In the alternative, the processor and the storage medium may reside as discrete components in a user terminal. Additionally, in some examples, the steps and/or actions of a method or algorithm may reside as one or any combination or set of codes and/or instructions on a machine readable medium and/or computer readable medium, which may be incorporated into a computer program product.

In one or more examples, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While examples of the present disclosure have been described in connection with examples thereof, it will be understood by those skilled in the art that variations and modifications of the examples described above may be made without departing from the scope hereof. Other examples will be apparent to those skilled in the art from a consideration of the specification or from a practice in accordance with examples disclosed herein.

What is claimed is:

1. A method for performing variable rate shading in graphics processing, comprising:
    performing a transformation pass over a current frame to associate a current pixel in a current frame with a previous pixel in a previous frame;
    analyzing a previous fragment, including the previous pixel, in the previous frame to determine whether the previous fragment includes one or more areas of frequency detail achieving a threshold;
    determining, based on the analyzing the previous fragment, a variable shading rate, to apply to a current fragment, including the current pixel;
    applying the variable shading rate to the current fragment in the current frame;
    comparing, during a previous variable rate shading pass in the previous frame, the previous pixel in the previous fragment to neighboring pixels in the previous fragment; and
    storing an indication of high frequency detail for the previous pixel based on the comparing, wherein analyzing the previous fragment is based at least in part on obtaining the indication.

2. The method of claim 1, wherein analyzing the previous fragment comprises comparing absolute pixel values of the previous pixel and one or more neighboring pixels from the previous frame to determine the one or more areas of frequency detail achieving the threshold in the previous frame.

3. The method of claim 2, wherein determining the variable shading rate comprises increasing or decreasing the variable shading rate for the current fragment where the current fragment is within the one or more areas.

4. The method of claim 2, wherein determining the variable shading rate comprises selecting one of a maximum, minimum, or average variable shading rate for the current fragment where the current fragment is within the one or more areas.

5. The method of claim 2, wherein determining the variable shading rate comprises selecting the variable shading rate as a neighboring variable shading rate used for neighboring fragments in the current frame where the current fragment is within the one or more areas.

6. The method of claim 1, wherein analyzing the previous fragment comprises utilizing a high pass filter over the previous frame based on a threshold frequency to determine the one or more areas of frequency detail achieving the threshold in the previous frame.

7. The method of claim 6, wherein determining the variable shading rate comprises increasing or decreasing the variable shading rate for the current fragment where the current fragment is within the one or more areas.

8. The method of claim 6, wherein determining the variable shading rate comprises selecting one of a maximum, minimum, or average variable shading rate for the current fragment where the current fragment is within the one or more areas.

9. The method of claim 6, wherein determining the variable shading rate comprises selecting the variable shading rate as a neighboring variable shading rate used for neighboring fragments in the current frame where the current fragment is within the one or more areas.

10. The method of claim 1, further comprising obtaining an indication of a frequency associated with the previous pixel from one or more texture maps, wherein analyzing the previous fragment is based at least in part on obtaining the indication.

11. The method of claim 1, wherein analyzing the previous fragment is performed in a separate process than graphics processing for the current frame.

12. The method of claim 1, further comprising selecting a different variable shading rate for a fragment in the current frame based at least in part on determining that the transformation pass failed for the fragment.

13. The method of claim 12, wherein selecting the different variable shading rate comprises selecting a maximum variable shading rate for the different fragment.

14. The method of claim 1, further comprising performing a temporal anti-aliasing pass over the current frame, wherein the transformation pass is shared between the temporal anti-aliasing pass and the shading rate determination pass.

15. A computer device, comprising:
a memory; and
a graphics processing unit (GPU) in communication with the memory, wherein the GPU is configured to:
perform a transformation pass over a current frame to associate a current pixel in a current frame with a previous pixel in a previous frame;
analyze a previous fragment, including the previous pixel, in the previous frame to determine whether the previous fragment includes one or more areas of frequency detail achieving a threshold;
determine, based on analyzing the previous fragment, a variable shading rate, to apply to a current fragment including the current pixel;
apply the variable shading rate to the current fragment in the current frame;
compare, during a previous variable rate shading pass in the previous frame, the previous pixel in the previous fragment to neighboring pixels in the previous fragment; and
store an indication of high frequency detail for the previous pixel based on the comparing, wherein the GPU is configured to analyze the previous fragment is based at least in part on obtaining the indication.

16. The computer device of claim 15, wherein the GPU is further configured to compare absolute pixel values of the previous pixel and one or more neighboring pixels from the previous frame to determine one or more areas of frequency detail achieving a threshold in the previous frame, wherein the GPU is configured to determine the variable shading rate at least in part by determining whether the current fragment is within the one or more areas.

17. The computer device of claim 15, wherein the GPU is further configured to utilize a high pass filter over the previous frame based on a threshold frequency to determine areas of frequency detail achieving a threshold in the previous frame, wherein the GPU is configured to determine the variable shading rate at least in part by determining whether the current fragment is within the one or more areas.

18. A non-transitory computer-readable medium storing computer-executable instructions executable by a processor for performing variable rate shading in graphics processing, comprising:
instructions for performing a transformation pass over a current frame to associate a current pixel in a current frame with a previous pixel in a previous frame;
instructions for analyzing a previous fragment, including the previous pixel, in the previous frame to determine whether the previous fragment includes one or more areas of frequency detail achieving a threshold;
instructions for determining, based on the instructions for analyzing the previous fragment, a variable shading rate, to apply to a current fragment including the current pixel;
instructions for applying the variable shading rate to the current fragment in the current frame;
instructions for comparing, during a previous variable rate shading pass in the previous frame, the previous pixel in the previous fragment to neighboring pixels in the previous fragment; and
instructions for storing an indication of high frequency detail for the previous pixel based on the comparing, wherein the instructions for analyzing the previous fragment are based at least in part on obtaining the indication.

19. The non-transitory computer-readable medium of claim 18, wherein the instructions for analyzing the previous fragment comprise instructions for comparing absolute pixel values of the previous pixel and one or more neighboring pixels from the previous frame to determine the one or more areas of frequency detail achieving the threshold in the previous frame.

20. The non-transitory computer-readable medium of claim 19, wherein the instructions for determining the variable shading rate comprise instructions for increasing or decreasing the variable shading rate for the current fragment where the current fragment is within the one or more areas.

* * * * *